United States Patent [19]

Kubota

[11] Patent Number: 4,501,493
[45] Date of Patent: Feb. 26, 1985

[54] APPARATUS FOR DETECTING A POSITION OF AN OPTICAL PICKUP

[75] Inventor: Shigeo Kubota, Tokyo, Japan

[73] Assignee: Sony Corporation, Tokyo, Japan

[21] Appl. No.: 437,214

[22] Filed: Oct. 28, 1982

[51] Int. Cl.³ .............................................. G01J 1/36
[52] U.S. Cl. ..................... 356/123; 250/201; 350/437; 369/45
[58] Field of Search ............. 356/123; 350/437; 250/201 DF, 201 AF; 369/45, 46

[56] References Cited

U.S. PATENT DOCUMENTS

| 3,588,227 | 6/1971 | Yamamoto et al. | 350/437 |
| 3,992,575 | 11/1976 | Velzel et al. | 250/201 |
| 4,152,586 | 5/1979 | Elliott et al. | 250/201 |
| 4,287,413 | 9/1981 | Kanamaru | 369/45 |

FOREIGN PATENT DOCUMENTS

| 98716 | 6/1896 | Fed. Rep. of Germany | 350/437 |
| 2836428 | 3/1980 | Fed. Rep. of Germany | 356/123 |
| 139640 | 10/1980 | Japan | 369/45 |
| 7248 | 1/1981 | Japan | 369/45 |

Primary Examiner—R. A. Rosenberger
Attorney, Agent, or Firm—Lewis H. Eslinger; Alvin Sinderbrand

[57] ABSTRACT

An apparatus for detecting a position of an optical pickup is disclosed in which there are provided a lens having lens areas of four quadrants sectioned by two planes, each including an optical axis and being perpendicular to each other, focal lengths of the lens areas of first and third quadrants being selected equal with each other, focal lengths of the lens areas of second and fourth quadrants being selected equal to each other, the focal length of the lens areas in the first and third quadrants being selected different from that of the lens areas in the second and fourth quadrants, the respective lens areas having axial symmetry, the lens being located within the optical path of the reflected beam on an optical disc, and a photo detector having four divided detecting portions in correspondence with the respective lens areas for detecting the reflected beam passed through the lens.

10 Claims, 13 Drawing Figures

APPARATUS FOR DETECTING A POSITION OF AN OPTICAL PICKUP

BACKGROUND OF THE INVENTION

1. Field of the Invention

The present invention relates generally to an apparatus for detecting a position of an optical pickup and is directed more particularly to an apparatus for detecting a position of an optical pickup for use with an optical reproducing apparatus for a video or PCM (pulse code modulation) audio disc.

2. Description of the Prior Art

In the art, there has been proposed such an optical reproducing apparatus in which the laser beam from a laser light source is converged by an objective lens on the record surface of an optical disc, the reflected laser beam thereon is introduced to the detecting plane of a photo detector and a reproduced signal is derived from the photo detector.

In such the optical reproducing apparatus, there has been disclosed in the U.S. Pat. No. 4,023,033 such a focus servo technique in which the light detecting plane of the photo detector is made of a circular-shape; this light detecting plane is divided equally to four detecting portions of first to fourth quadrants; a semi-cylindrical lens is located in front of the photo detector; a focus state detecting output is provided from the difference between the sum of detected outputs from the detecting portions of the first and third quadrants and the sum of detected outputs from the detecting portions of the second and fourth quadrants; and the position of an objective lens on its optical axis is controlled by the focus state detecting output to thereby carry out the focus servo.

Now, the above focus servo technique will be explained with reference to FIGS. 1 through 6. In FIG. 1, reference numeral 1 generally designates a semi-cylindrical lens, 2 its semi-cylindrical surface, and 3 its rectangular flat plane, respectively. On the plane 3, there is assumed the orthogonal coordinate in which its center point or origin 0 is taken on the center of the plane 3, its X-axis is parallel to the generatrix of the semi-cylindrical surface 2 and passes through the origin 0, the Y-axis is perpendicular to the generatrix or X-axis and passes through the origin 0 and the Z-axis is perpendicular to the plane 3 and passes through the origin 0. Further, a point, which is at the side of the semi-cylindrical surface 3 of the lens 1 and on the Z-axis but apart from the origin 0 by a predetermined distance, is taken as another origin 0', and a rectangular coordinate is assumed with the origin 0' is at its center in which, within the plane perpendicular to the Z-axis, x- and y-axes are considered respectively intersecting the X- and Y-axes by 45° in their positive sides. Then, the circular detecting plane of the photo detector exists in the x and y plane (plane including x- and y-axes) and the detecting plane is divided equally to four portions by the x- and y-axes to thereby divide the photo detector to light detecting portions of first to fourth quadrants I to IV.

Then, a converging beam is incident on the plane 3 of the lens 1 in such a manner that, as shown in FIG. 2, the optical axis of a beam spot 4 formed by the converging beam is coincident with the Z-axis and the spot 4 on the plane 3 becomes a circular shape (FIG. 2 shows the spot 4 in a perspective view). Temporarily, axes a, b, c and d, each corresponding to the radius of the spot 4, are provided in the first to fourth quadrants I to IV at the positions intersecting the X- and Y-axes at 45°, respectively.

Now, with reference to FIG. 3, the loci of light rays 5 and 6 on the cross-section of the lens 1 (referred to as X0Z cross-section) including the X-axis, origin 0 and the Z-axis and on the cross-section of the lens 1 (referred to as Y0Z cross-section) including the Y-axis, origin 0 and the Z-axis when the converging beam is incident on the plane 3 of the lens 1 will be explained. Since the Y0Z cross-section is constant in thickness, the ray 6 incident on the Y0Z cross-section advances parallel to the ray before being incident thereon after passing therethrough and then passes through a point P on the Z-axis. While, since the X0Z cross-section forms a convex lens, the ray 5 incident on the X0Z cross-section is refracted to the side of the Z-axis and hence passes through a point P' nearer to the lens 1 than the point P.

It is assumed that the detecting plane DT of the photodetector is positioned at the point 0' (refer to FIG. 1) on the Z-axis between the points P and P' and when a spot 4' of the laser beam irradiated on the detecting plane DT becomes a circle as shown in FIG. 5, the converging beam from the objective lens is focussed on the record surface of the optical disc as a focal point. Thus, the fact that the focal point of the converging beam from the objective lens is formed before or after the record surface of the optical disc is equivalent to the fact that the position of the detecting plane DT of the photo detector is shifted to a point α before the point 0' or to a point β after the point 0' and hence the spot 4' on the detecting plane DT of the photo detector becomes an ellipse as shown in FIG. 4 or 6. That is, the elliptic spot 4 in case of FIG. 4 has its longer diameter in the direction at 45° relative to the x-axis in the first and third quadrants I and III, while the elliptic spot 4' in case of FIG. 6 has its longer diameter in the direction at 45° relative to the x-axis in the second and fourth quadrants II and IV. In FIGS. 4 to 6, axes a', b', c' and d' correspond to those a, b, c and d of FIG. 2, respectively.

Therefore, if the detecting plane of the photo detector is larger than the spot 4' in the area, based upon the difference between the sum of the detected outputs from the detecting portions of the first and third quadrants I and III and the sum of the detected outputs from the detecting portions of the second and fourth quadrants II and IV, the converging state of the laser beam on the record surface of the optical record medium such as an optical disc by the objective lens can be detected. Accordingly, the focus servo becomes possible by moving the objective lens along its optical axis so as to make the above difference zero.

However, the beam passed through the above semi-cylindrical lens 1 is not kept in similarity of beam distribution, so that when the semi-cylindrical lens is combined with the photo detector, it is difficult to obtain a correct tracking error signal (separated from a focus error signal) by the symmetry of light distribution from the photo detector.

OBJECTS AND SUMMARY OF THE INVENTION

Accordingly, it is an object of the present invention to provide a novel apparatus for detecting a position of an optical pickup.

It is another object of the invention to provide an apparatus for detecting a position of an optical pickup employing such an optical element or lens which has axial symmetry at respective four quadrants, similarity in distribution of emitted beam from the lens and different powers due to the difference of angles of the plane including the optical axis.

According to an aspect of the present invention, there is provided an apparatus for detecting a position of an optical pickup which comprises:

a lens having lens areas of four quadrants sectioned by two planes, each including an optical axis and being perpendicular with each other, focal lengths of said lens areas of first and third quadrants being selected equal, focal lengths of said lens areas of second and fourth quadrants being selected equal, the focal length of the lens areas in the first and third quadrants being selected different from that of the lens areas in the second and fourth quadrants, and said respective lens areas having axial symmetry, said lens being located within an optical path of a reflected beam on an optical disc; and a photo detector having four divided detecting portions in correspondence with said respective lens areas for detecting the reflected beam passed through said lens.

The other objects, features and advantages of the present invention will become apparent from the following description taken in conjunction with the accompanying drawings through which the like references designate the same elements and parts.

DESCRIPTION OF THE PREFERRED EMBODIMENT

Hereinafter, the present invention will be described with reference to the attached drawings.

First, an example of the lens used in the apparatus for detecting a position of an optical pickup according to the invention will be described.

Figure 1:
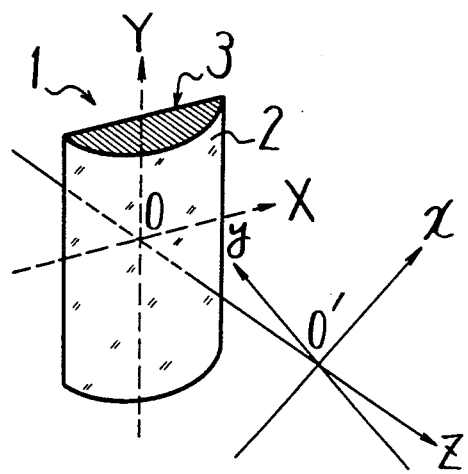
FIG. 1 is a perspective view showing a semi-cylindrical lens used in a prior art apparatus of this kind.
Figure 4:
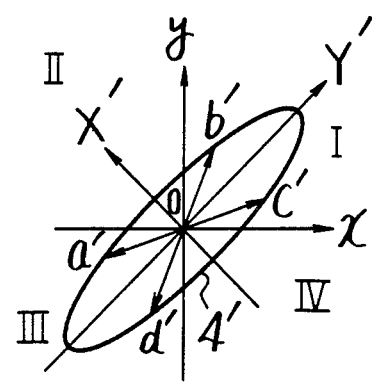
FIGS. 4, 5 and 6 are each a perspective view showing a beam spot.
Figure 2:
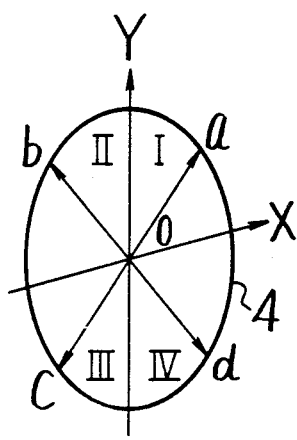
FIG. 2 is a perspective view showing a beam spot irradiated on the rectangular plane of the semi-cylindrical lens shown in FIG. 1.
Figure 5:
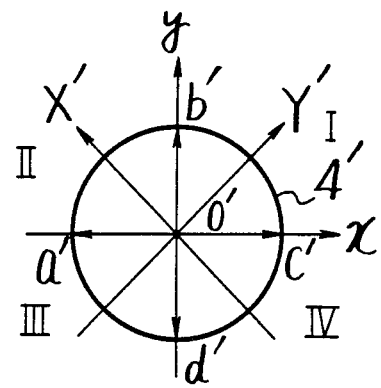
Figure 3:
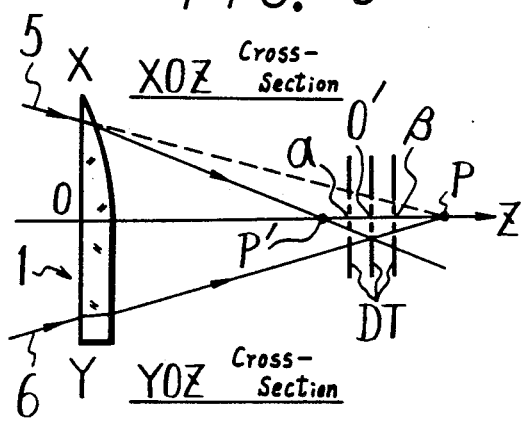
FIG. 3 is a schematic diagram illustrating the loci of the light rays incident on the semi-cylindrical lens shown in FIG. 1.
Figure 6:
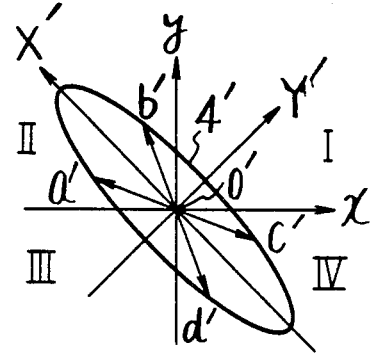
Figure 7:
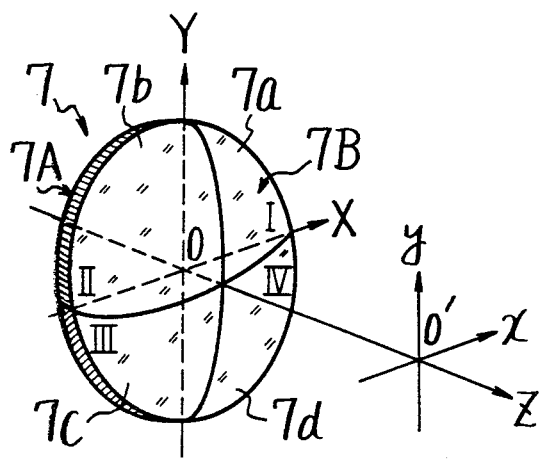
FIG. 7 is a perspective view depicting an example of the lens which constitutes a main part of the apparatus for detecting a position of an optical pickup according to the present invention.

As shown in FIG. 7, an example of the lens 7 according to the invention includes four lens areas $7a$, $7b$, $7c$ and $7d$ of first to fourth quadrants I, II, III and IV which are sectioned by two planes including the optical axis or Z-axis and perpendicular to each other i.e. XZ plane (plane including the X- and Z-axes) and YZ plane (plane including the Y- and Z-axes). In this case, the focal lengths of the lens areas $7a$ and $7c$ at the first and third quadrants I and III are selected equal (which is assumed as $f_1$); the focal lengths of the lens areas $7b$ and $7d$ at the second and fourth quadrants II and IV are selected also equal (which is assumed as $f_2$); the focal length $f_1$ of the lens areas $7a$ and $7c$ at the first and third quadrants I and III and the focal length $f_2$ of the lens areas $7b$ and $7d$ at the second and fourth quadrants II and IV are selected different to each other; and the respective lens areas $7a$ to $7d$ are located symmetry with respect to the optical axis or Z-axis. Although if the focal lengths $f_1$ and $f_2$ satisfy $f_1 \neq f_2$, they could be either of positive or negative. However, in view of practical use, the focal lengths $f_1$ and $f_2$ are both positive and include the infinity $\infty$.

In the illustrated example, the lens 7 is a planoconvex lens. And, the above-mentioned rectangular coordinate consisting of the X- and Y-axes (where 0 is its origin) is assumed to be formed on a plane 7A of the lens 7, and the X-, Y- and Z- (which coincides with the optical axis of the lens 7) axes form the orthogonal coordinates.

As the manner to manufacture such lens 7, there are proposed three different methods. The first method is such one that the elements of four quadrants made of two kinds of lens materials such as glass plastics or the like having different refractive indexes are bonded together by adhesive agent and so on and then the elements thus bonded are polished to make the lens 7.

The second method is as follows. The same lens material such as glass, plastics or the like is polished to make lenses different in curvature i.e. different in focal length, the respective lenses thus made are divided into lenses of four quadrants, and the respective divided lens areas are bonded together by adhesive agent or the like two by two to provide the lens 7.

The third or last method is as follows. A metal mold having different curvatures is used to provide the lens 7 from plastic material with the structure mentioned above. This third method has such an advantage as compared with the first and second methods that no process to bond the lens elements or areas is required.

Such a rectangular coordinate is provided at the side of a spherical surface 7B of the lens 7 in which its origin 0' is apart from the origin 0 by a predetermined distance and its x- and y-axes are respectively parallel to the X- and Y-axes within the plane perpendicular to the Z-axis and parallel to the plane 7A of the lens 7. Then, the circular detecting plane of the photo detector is made coincident with the x and y plane (on which the x- and y-axes exists), and the detecting plane of the photo detector is divided equally to four areas by the x- and y-axes to thereby divide the photo detector into the light detecting portions of four quadrants.

Then, onto the plane 7A of the lens 7 incident is a parallel beam in such a manner that its optical axis coincides with the Z-axis and its cross-sectional area on the plane 7A becomes a circle.

In the case that the parallel beam is projected onto the plane 7A of the lens 7, the loci of the rays 5 and 6 incident on the lens areas $7a$ and $7b$ of the first and second quadrants I and II in the cross-sectional area on the x-axis will be explained with reference to FIG. 8. The ray of the ray 5 incident on the lens area $7a$ of the lens 7 and then passed therethrough is refracted to the side of the Z-axis and then passes through a focal point $F_1$ of the lens area $7a$ on the Z-axis, while the ray of the ray 6 incident on the lens area $7b$ of the lens 7 and then passed therethrough is refracted also to the side of the Z-axis and then passes through a focal point $F_2$ on the Z-axis of the lens area 7b more apart from the lens 7 than the focal point $F_1$.

Figure 9:
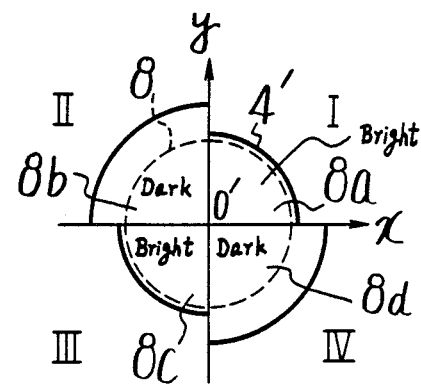
FIGS. 9, 10 and 11 are respectively diagrams showing a beam spot.
Figure 8:
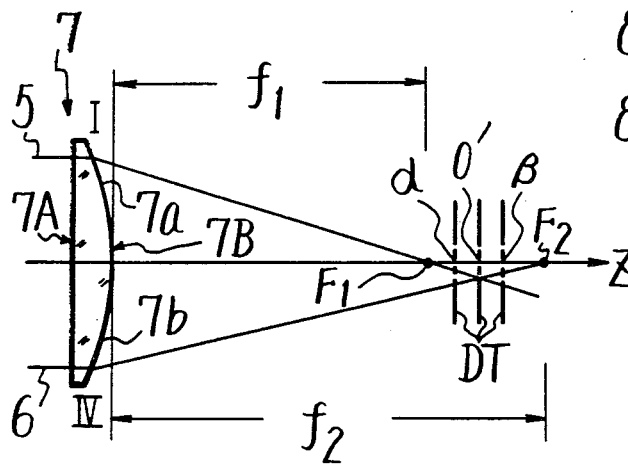
FIG. 8 is a schematic diagram illustrating the loci of the light rays incident on the lens shown in FIG. 7.
Figure 10:
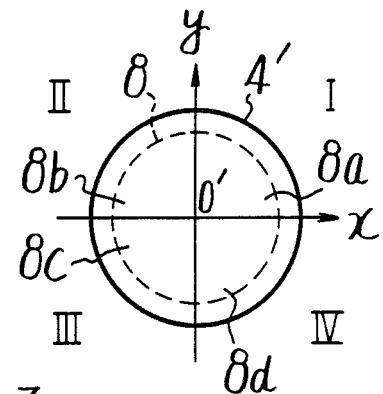
Figure 11:
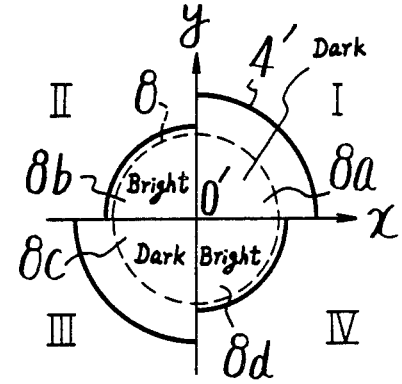

In FIG. 8, it is assumed that when the detecting plane DT of the photo detector is positioned at the point 0' (refer to FIG. 7) between the focal points $F_1$ and $F_2$ and the spot 4' of the irradiated beam on the detecting plane DT becomes a circle as shown in FIG. 10, the converging beam from the objective lens is just focussed on the record surface of the optical disc (not shown). Under such assumption, the fact that the focal point of the converging beam from the objective lens is focussed before or after the record surface of the optical disc is equivalent to the fact that the position of the detecting plane DT of the photo detector is shifted to a point α nearer to the lens 7 than the point 0' or to a point β more apart from the lens 7 than the point 0'. Thus, in such a case the spot 4' on the detecting plane DT of the photo detector becomes as shown in FIG. 9 or 11 in which each of the spots 4' is formed of the combination of ¼ circles different in radius. The spot 4' in FIG. 9 is formed of ¼ circles in the second and fourth quadrants II and IV which are large in radius and ¼ circles in the first and third quadrants I and III which are smaller than the former in radius. While, the spot 4' in FIG. 11 is formed of ¼ circles in the first and third quadrants I and III which are large in radius and ¼ circles in the second and fourth quadrants II and IV which are smaller than the former in radius.

In each of FIGS. 9 to 11, the light amounts of the spot 4' in the respective quadrants are equal. However, when the radiuses of the ¼ circles are different one another, the light amount per unit area is different and hence there appear bright and dark patterns.

In this invention, therefore, as shown in FIGS. 9 to 11, the configuration of a detecting plane 8 of the photo detector is formed as a circle whose radius is selected little smaller than that of ¼ circles which are smaller than the other ¼ circles whose radius is larger than the former, and the detecting plane 8 is divided equally to four portions to form detecting portions 8a, 8b, 8c and 8d of the first through fourth quadrants I to IV. As a result, the detected outputs from the respective detecting portions are in proportion to the light amount of the spot 4' per unit area thereof.

Figure 12:
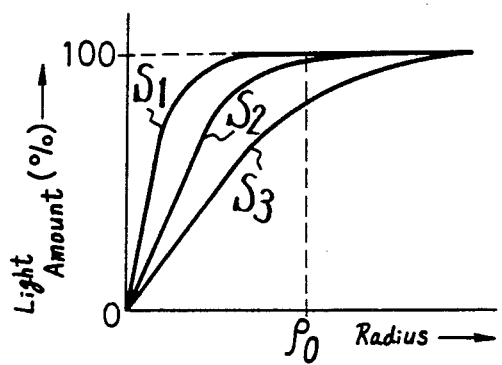
FIG. 12 is a graph showing characteristic curves of the beam spot.

When a converging beam is irradiated on a certain plane, the relation between the light amount (%) within a circular area of the converging beam spot and the converging state of the beam is shown in the graph of FIG. 12 by curves $S_1$, $S_2$ and $S_3$. The curve $S_1$ represents the case that the converging beam is just focussed on the plane, and the curves $S_2$ and $S_3$ represent the case that the converging beam is focussed before and after the plane. Accordingly, if the light amount in a circular area of a predetermined radius $p_0$ (encircled energy) is detected, the converging state of the converging beam on that plane can be detected.

Therefore, according to this invention, based upon the difference between the sum of the detected outputs from the light detecting portions in the first and third quadrants I and III and the sum of the detected outputs from the light detecting portions in the second and fourth quadrants II and IV, the converging state of the laser beam by the objective lens on the record surface of the optical record medium such as an optical disc can be detected. Accordingly, if the objective lens is moved along its optical axis so as to make the above difference zero, the focus servo becomes possible.

Further, since the beam passed through the lens 7 is kept in similarity of beam distribution, when the lens 7 is combined with the photo detector, a correct tracking error signal owing to the symmetry of light distribution can be obtained. One of the example to obtain the correct tracking error signal is as follows. From the above-mentioned difference between the detected outputs, provided are the focus error signal (low in frequency) and tracking error signal (high in frequency) by the frequency separation. Further, by the difference between the sum of the detected outputs from the light detecting portions of the first and second (or first and fourth) quadrants I and II (I and IV) and the sum of the detected outputs from the light detecting portions of the third and fourth (or second and third) quadrants III and IV (or II and III), the tracking state can be detected. Accordingly, it is sufficient for carrying out the tracking servo that, for example, a tracking mirror is controlled to make the above difference zero. In this case, the reproduced signal can be obtained from the sum of the detected outputs from all the light detecting portions.

Now, with reference to FIG. 13, an example of the apparatus for detecting a position of an optical pickup in which the lens 7 explained above is employed will be described.

Figure 13:
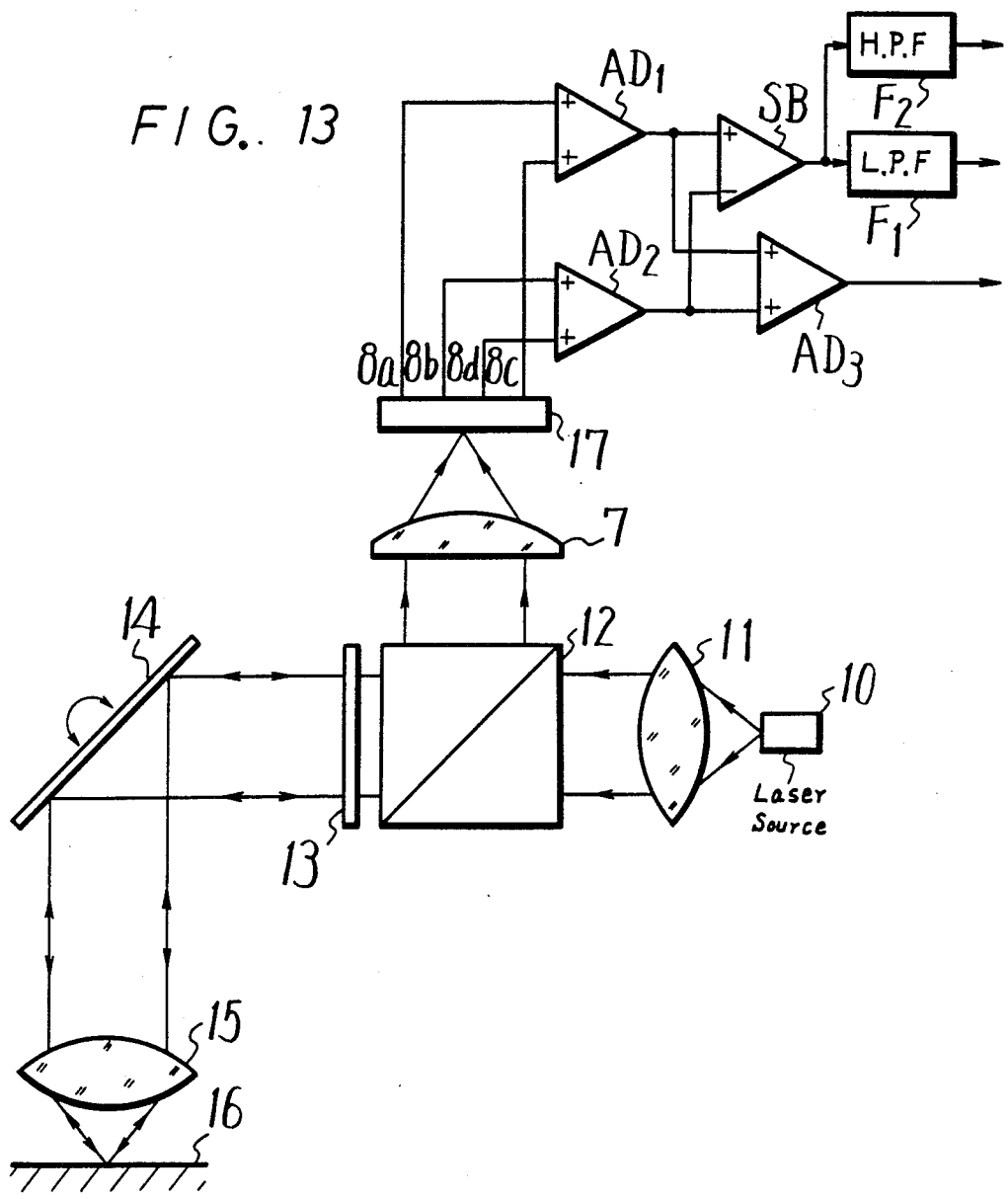
FIG. 13 is a systematic diagram showing an example of the apparatus for detecting a position of an optical pickup according to the invention.

In the example of the invention shown in FIG. 13, the diverging laser beam emitted from a laser light source 10 is introduced to a collimator lens 11 to be a parallel beam. The parallel beam from this collimator lens 11 is introduced through a polarizing beam splitter 12 and a ¼ wave plate 13 to a galvano-mirror (tracking mirror) 14 to be reflected thereon. The reflected beam from the galvano-mirror 14 is introduced to an objective lens 15 and then focussed thereby on the record surface of an optical disc 16. The reflected beam on the record surface of the optical disc 16 is introduced through the objective lens 15, the galvano-mirror 14 and the ¼ wave plate 13 to the beam splitter 12. The beam reflected on the beam splitter 12, which is an approximately parallel beam, is focussed by the lens 7 on the light detecting plane of a photo detector 17. The detected outputs from the respective detecting portions 8a, 8b, 8c and 8d of the photo detector 17 are supplied to adders, $AD_1$ $AD_2$ and $AD_3$ and subtractor SB and then a low pass filter $F_1$ and a high pass filter $F_2$ so as to produce the focus error signal, tracking error signal and reproduced signal as described above.

According to the present invention mentioned above, the optical element (lens) which has different powers dependent upon the directions within the plane perpendicular to the optical axis is employed, so that the lens has axial symmetry and the beam emitted from the lens has kept the similarity at the respective portions of four quadrants in beam distribution.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. An apparatus for detecting a position of an optical pickup, comprising:

a lens having lens areas of four quadrants divided at two planes which are perpendicular to each other and intersect at an optical axis of the lens, focal lengths of said lens areas of first and third quadrants being equal to each other, focal lengths of said lens areas of second and fourth quadrants being equal to each other, the focal length of the lens areas in the first and third quadrants being different from that of the lens areas in the second and fourth quadrants, and said lens areas of equal focal lengths having axial symmetry about said optical axis, said lens being located within an optical path of a reflected beam from an optical disk; and a photo detector having four divided detecting portions in correspondence with respective lens areas of said lens for detecting the reflected beam passed through said lens.

2. An apparatus for detecting a position of an optical pickup according to claim 1, further comprising means for providing a difference between a sum of outputs from divided detecting portions corresponding to the lens areas of first and third quadrants and a sum of outputs form divided detecting portions corresponding to the lens area of second and fourth quadrants, said difference representing a distance between said optical disk and said optical pickup.

3. An apparatus for detecting a position of an optical pickup, comprising:
  a lens having four lens areas defined as four consecutive quadrants;
  said quadrants being sectioned by two perpendicular planes, the intersection of said planes defining an opticl axis;
  said lens areas in first and third quadrants having the same first focal length;
  said lens areas in second and fourth quadrants having the same second focal length;
  said first and second focal lengths being unequal;
  said lens areas of the same focal length being axially symmetrical about said optical axis; and
  photo detecting means for detecting the light of a beam passed through said lens, said photo detecting means detecting separately the light passed through each of said four lens areas.

4. An apparatus according to claim 3, wherein said photo detecting means includes a photo detector having four divided detecting portions corresponding to said four lens areas.

5. An apparatus according to claim 4, further comprising:
  means for producing an output from each of said detecting portions dependent upon the light received by each detecting portion from its respective lens area;
  means for summing the outputs from the detecting portions corresponding to said lens areas of first and third quadrants to provide a first sum;
  means for summing the outputs from the detecting portions corresponding to said lens areas of second and fourth quadrants to provide a second sum;
  means for providing a difference of said first and second sums and for generating a difference signal therefrom; and
  means for determining the distance between a reference point in the path of said light beam and said photo detecting means in response to said difference signal.

6. An apparatus according to claim 5, further comprising:
  an optical disk; and
  said optical disk defining said reference point in the path of said light beam.

7. An apparatus according to claim 5, wherein:
  said photo detecting means defines a photo detecting plane; and
  the output from each of said detecting portions is dependent on the distance between the focal points of each of said four lens areas and said photo detecting plane.

8. An apparatus according to claim 5, further comprising:
  focus error signal detecting means; and
  means for transmitting said difference signal to said focus error signal detecting means.

9. An apparatus according to claim 5, further comprising:
  tracking error signal detecting means; and
  means for transmitting said difference signal to said tracking error signal detecting means.

10. An apparatus according to claim 3, further comprising:
  an optical disk; and
  said beam of light being first reflected from said optical disk and then passed through said lens.

* * * * *